US012579571B2

(12) United States Patent
Walkosz-Migliacio

(10) Patent No.: US 12,579,571 B2
(45) Date of Patent: Mar. 17, 2026

(54) METHOD FOR IMPROVING AESTHETIC APPEARANCE OF RETAILER GRAPHICAL USER INTERFACE

(71) Applicant: TARGET BRANDS, INC., Minneapolis, MN (US)

(72) Inventor: Lisa Walkosz-Migliacio, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 581 days.

(21) Appl. No.: 18/160,569

(22) Filed: Jan. 27, 2023

(65) Prior Publication Data

US 2024/0257397 A1     Aug. 1, 2024

(51) Int. Cl.
*G06Q 30/0601*     (2023.01)
*G06T 7/90*     (2017.01)
*G06T 11/00*     (2006.01)

(52) U.S. Cl.
CPC ........... *G06Q 30/0643* (2013.01); *G06T 7/90* (2017.01); *G06T 11/001* (2013.01); *G06T 2200/24* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 6,734,871 | B2 | 5/2004 | Weil et al. |
| 7,219,309 | B2 | 5/2007 | Kaasila et al. |

| | | | |
|---|---|---|---|
| 8,417,568 | B2 | 4/2013 | Nong et al. |
| 8,560,665 | B2 | 10/2013 | Parsons et al. |
| 8,677,234 | B2 | 3/2014 | Underwood et al. |
| 8,713,456 | B2 | 4/2014 | Hernandez et al. |
| 8,781,175 | B2 | 7/2014 | Wang et al. |
| 9,230,266 | B2 | 1/2016 | Bentley |
| 9,262,036 | B2 | 2/2016 | Nurse et al. |
| 9,703,886 | B2 | 7/2017 | Baugher |
| 10,769,231 | B2 | 9/2020 | Kol et al. |
| 2014/0229296 | A1 | 8/2014 | Ye et al. |

(Continued)

FOREIGN PATENT DOCUMENTS

| | | | | |
|---|---|---|---|---|
| JP | 2004056783 A | * | 2/2004 | ............... H04N 1/52 |

*Primary Examiner* — Jwalant Amin

(74) *Attorney, Agent, or Firm* — HSML P.C.

(57)     ABSTRACT

A method for altering the aesthetic appearance of a retailer graphical user interface is provided. The method includes a retailer online service receiving a guest-submitted content, and an image processor of the retailer online service performing image processing of the guest-submitted content to generate a plurality of pixels. The method also includes the image processor identifying a color of each pixel of the plurality of pixels, and the image processor grouping each of the plurality of pixels into a plurality of clusters based on the color of each pixel of the plurality of pixels. Also, the method includes the image processor identifying a representative color for each of the plurality of clusters to develop a color scheme for the guest-submitted content. The method further includes implementing the color scheme when displaying the guest-submitted content onto the retailer graphical user interface.

20 Claims, 15 Drawing Sheets
(12 of 15 Drawing Sheet(s) Filed in Color)

(56) References Cited

U.S. PATENT DOCUMENTS

| | | | |
|---|---|---|---|
| 2015/0356740 A1* | 12/2015 | Subbaian | G06F 18/24<br>382/176 |
| 2015/0379739 A1* | 12/2015 | Dorner | G06T 11/001<br>345/600 |
| 2017/0024404 A1 | 1/2017 | Tocchini et al. | |
| 2018/0025002 A1* | 1/2018 | Dorner | G06T 7/90<br>382/165 |
| 2021/0303905 A1* | 9/2021 | Baek | G06V 30/153 |
| 2023/0362293 A1* | 11/2023 | Gao | H04M 1/72427 |

* cited by examiner

200

800'

805'

810

Store Logo   Categories   Deals   What's New   Pickup & Delivery   Search   Sign in 2
Women's relaxed fit flannel
See all now 3
Posable skeletons
See all posts

905

Colors
- ☐ ☐ electric-blue
- ☐ ■ red
- ☑ ■ deep-pink
- ☑ ■ magenta
- ☐ ▨ orange
- ☑ ▨ mona-lisa
- ☑ ▨ fuchsia-pink
- ☐ ☐ yellow
- ☐ ☐ canary
- ☐ ☐ white

910

Image

900

915

METHOD FOR IMPROVING AESTHETIC APPEARANCE OF RETAILER GRAPHICAL USER INTERFACE

FIELD

This disclosure relates generally to improving the aesthetic appearance of a retailer graphical user interface (GUI). More specifically, this disclosure relates to a method and system for identifying a color scheme of guest-submitted content submitted to a retailer online service and applying the color scheme to at least a portion of the retailer GUI displaying the guest-submitted content.

BACKGROUND

Online retail shopping continues to evolve as retailer online services look for new ways of connecting with guests visiting their services. This can include incorporating guest-submitted content into the retailer online service. Improving the aesthetic appearance of the retailer online service that includes the guest-submitted content is desirable.

SUMMARY

This disclosure relates generally to improving the aesthetic appearance of a retailer graphical user interface (GUI). More specifically, this disclosure relates to a method and system for identifying a color scheme of guest-submitted content submitted to a retailer online service and applying the color scheme to at least a portion of the retailer GUI displaying the guest-submitted content.

The embodiments disclosed herein can allow a retailer online service to develop content specific color schemes for guest-submitted content received from guests of the retailer online service. The embodiments disclosed herein can then implement the content specific color schemes when displaying the guest-submitted content onto at least a portion of a retailer GUI.

In one embodiment, a method for altering the aesthetic appearance of a retailer graphical user interface is provided. The method includes a retailer online service receiving a guest-submitted content, and an image processor of the retailer online service performing image processing of the guest-submitted content to generate a plurality of pixels. The method also includes the image processor identifying a color of each pixel of the plurality of pixels, and the image processor grouping each of the plurality of pixels into a plurality of clusters based on the color of each pixel of the plurality of pixels. Also, the method includes the image processor identifying a representative color for each of the plurality of clusters to develop a color scheme for the guest-submitted content. The method further includes implementing the color scheme when displaying the guest-submitted content onto the retailer graphical user interface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to improving the aesthetic appearance of a retailer GUI. More specifically, this disclosure relates to a method and system for identifying a color scheme of guest-submitted content submitted to a retailer online service and applying the color scheme to at least a portion of the retailer GUI displaying the guest-submitted content.

As defined herein, a retailer GUI can be, for example, a website, an app, etc. that allows guests to browse, shop for, and purchase products available for purchase from a retailer.

Guest-submitted content, as defined herein refers to any processable content that includes pixels including image(s) such as photograph(s), video(s), graphics interchange format (GIF) file(s), etc. created by a guest of a retailer online service. In some embodiments, the guest-submitted content can show enjoyment of retailer products that can be shared with other guests.

Figure 1:
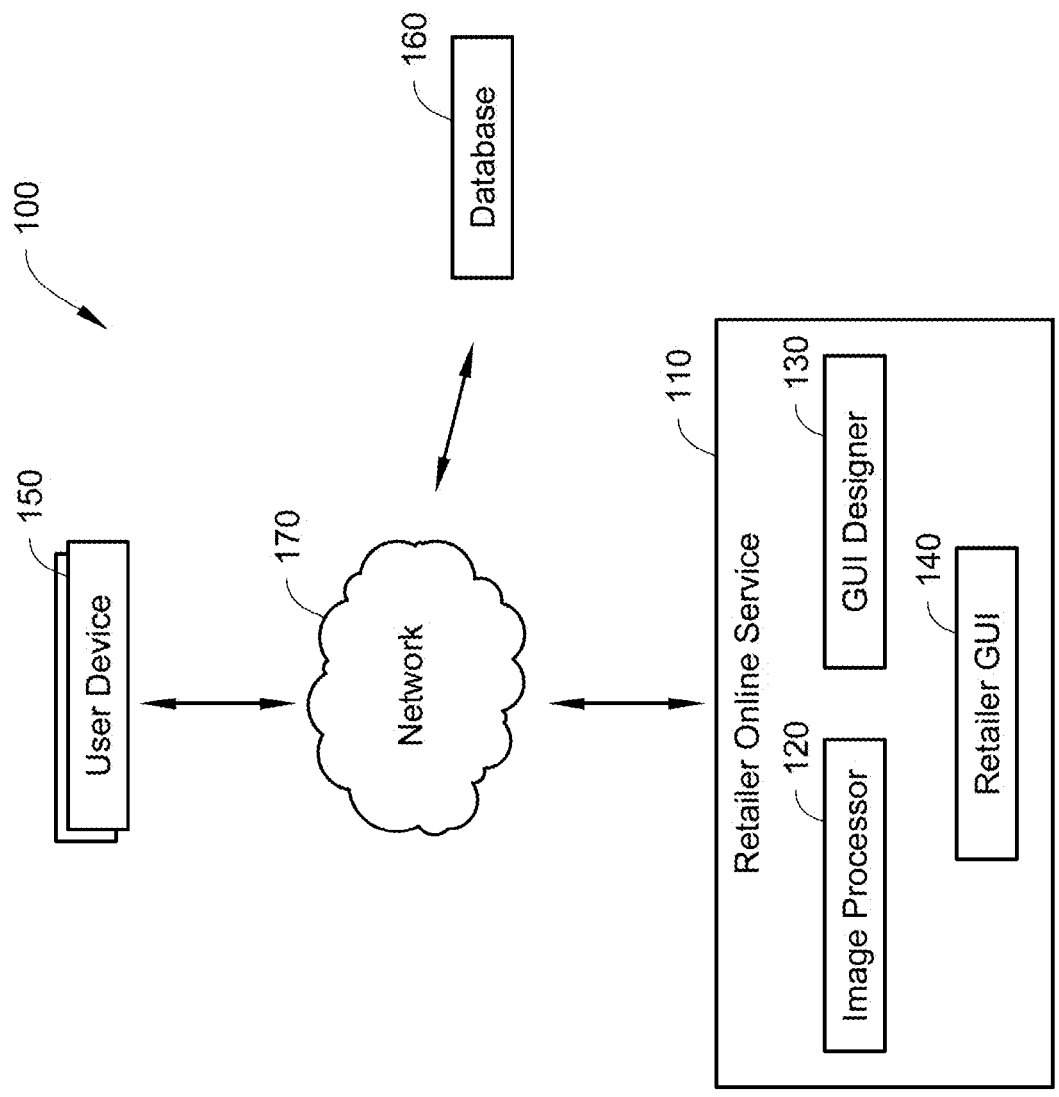
FIG. 1 illustrates a schematic diagram of a system for implementing secure electronic shopping cart transfer using an anonymous token, according to one embodiment.

FIG. 1 is a schematic diagram of a system 100 for identifying and applying a color scheme of guest-submitted content, according to one embodiment. The system 100 includes a retailer online service 110, one or more user devices 150, a database 160, and a network 170 connecting the retailer online service 110 to the one or more user devices 150 and the database 160.

The retailer online service 110 includes an image processor 120, a GUI designer module 130 and a retailer GUI 140. The retailer online service 110 is configured to provide an online shopping experience for guests accessing the retailer GUI 140 via the one or more user devices 150. In some embodiments, the retailer online service 110 is configured to receive guest-submitted content submitted by the one or more user devices 150 and is configured to store the guest-submitted content into the database 160. In some embodiments, aspects of the retailer online service 110 can be the same as or similar to aspects of the server device 935 shown and described in accordance with FIG. 9 below.

The image processor 120 is configured to retrieve guest-submitted content submitted by the one or more user devices 150 and is configured to analyze each piece of guest-submitted content to develop an aesthetically pleasing color scheme associated with the particular piece of guest-submitted content. Details of how the image processor 120 develops the aesthetically pleasing color scheme is discussed in more detail below with respect to FIG. 2.

The GUI designer module 130 is configured to implement the aesthetically pleasing color scheme into at least a portion of the retailer GUI 140. Details of how the aesthetically pleasing color scheme is implemented into at least a portion of the retailer GUI 140 is discussed in more detail below with respect to FIG. 2.

The retailer GUI 140 is configured to allow user(s), via the one or more user devices 150, to browse, shop for, and purchase products from a retailer. The retailer GUI 140 can be accessed by the user device(s) 150 via a website, an app, etc. Portions of the retailer GUI 140 can display guest-submitted content submitted by guests of the retailer GUI 140. Also, portions of the retailer GUI 140 can display color schemes developed by the image processor 120 for specific pieces of guest-submitted content. For example, the retailer GUI 140 can display a color scheme for a specific piece of guest-submitted content while that piece of guest-submitted content is being progressively loaded for display on one or more of the user devices 150. In another example, the retailer GUI 140 can utilize a color scheme developed for a specific piece of guest-submitted content for an entire website pate. In yet another example, the retailer GUI 140 can adjust colors applied for a film strip displayed on the retailer GUI 140 based on color scheme(s) developed for specific pieces of guest-submitted content being loaded into the film strip. Examples of the retailer GUI 140 implemented with guest-submitted content and an aesthetically pleasing color scheme is discussed in more detail below with respect to FIGS. 5A, 5B, 6A, 6B, 7, 8A, 8B, 8C and 10.

The one or more user devices 150 are configured to access the retailer online service 110 via the network 170. The one or more user devices 150 are the same as or similar to aspects of the computer device 900 as shown and described in accordance with FIG. 9 below. The user device(s) 150 can include, but are not limited to, a desktop computer, a cellular/mobile phone, a tablet device, and a laptop computer.

In some embodiments, the network 170 can be representative of the Internet. In some embodiments, the network 170 can include one or more local area networks (LANs), one or more wide area networks (WANs), one or more wireless networks, one or more cellular data networks, suitable combinations thereof, or the like. In an embodiment, aspects of the network 170 can be the same as or similar to aspects of the network 940 as shown and described in accordance with FIG. 9 below.

Figure 2:
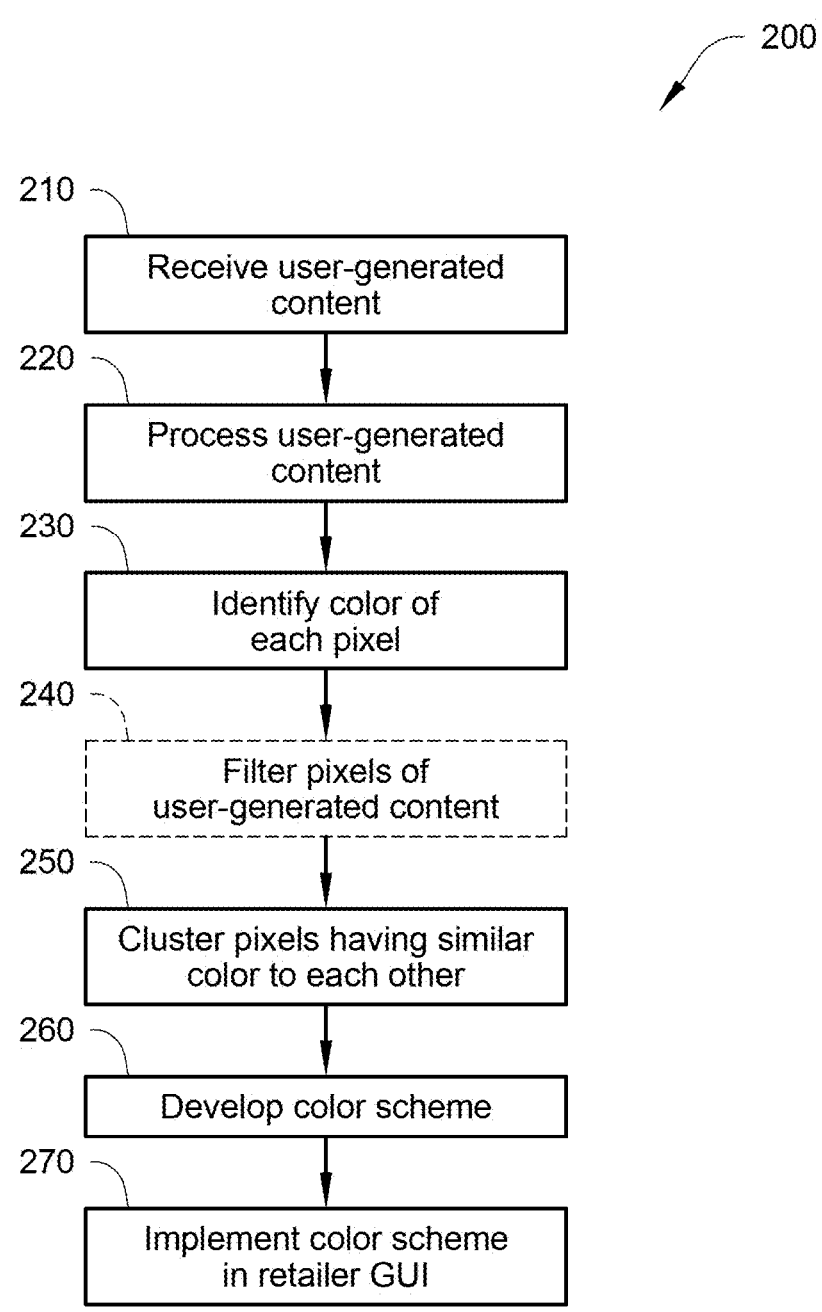
FIG. 2 illustrates a flowchart of a method for developing an aesthetically pleasing color scheme based on guest-submitted content and implementing the color scheme into at least a portion of a retailer GUI, according to one embodiment.

FIG. 2 illustrates a flowchart of a method 200 for developing an aesthetically pleasing color scheme based on guest-submitted content and implementing the color scheme into at least a portion of a retailer GUI using the system 100 shown in FIG. 1, according to one embodiment. The method 200 begins at 210 whereby the retailer online service 110 receives guest-submitted content from the one or more user devices 150 via the network 170. In some embodiments, a guest can submit the guest-submitted content to the retailer online service 110 via an upload link provided by the retailer GUI 140. Upon receipt of the guest-submitted content, the retailer online service 110 can provide the guest-submitted content to the image processor 120. In some embodiments, the retailer online service 110 can also store the guest-submitted content into the database 160. The method 200 then proceeds to 220.

At 220, the image processor 120 performs image processing of the guest-submitted content. In particular, the image processor 120 can scan the guest-submitted content to generate a two-dimensional array of pixels. In some embodiments, the image processor 120 can also scan the guest-submitted content to identify, for example, a background, subject(s), etc. of the guest-submitted content. The method 200 then proceeds to 230.

At 230, the image processor 120 identifies a color of each pixel in the guest-submitted content. The image processor 120 can then identify the color of each pixel using a mathematical color model such as a red-green-blue (RGB) color model, a cyan-magenta-yellow (CMY) or cyan-magenta-yellow-black (CMYK) color model, or any other mathematical color model. Accordingly, the color of each pixel can be identified using one or more numerical values such as, for example, a decimal or hexadecimal value. The method 200 then proceeds to optional 240 or to 250.

At optional 240, the image processor 120 filters the guest-submitted content to remove pixel(s) that could negatively impact the color scheme aesthetic. In some embodiments, the image processor 120 can use an image recognition algorithm to identify and filter out pixel(s) forming a background of the guest-submitted content so as to focus on the subject(s) (including guest(s), retailer product(s), etc.) shown in the guest-submitted content. In some embodiments, the image processor 120 can use an image recognition algorithm to identify and filter out pixel(s) of any faces shown in the guest-submitted content. In some embodiments, the image processor 120 can use an image recognition algorithm to identify and filter out pixel(s) that form the subject(s) shown in the guest-submitted content so as to focus on the background shown in the guest-submitted content. In some embodiments, the image processor 120 can filter out certain colors (e.g., remove white pixels). In some embodiments, the image processor 120 can use a machine learning algorithm to, for example, identify subject(s) of the user generated content, identify a background of the guest-submitted content, and determine what pixel(s) to filter out in order to improve the color scheme aesthetic. The method 200 then proceeds to 250

At 250, the image processor 120 groups or clusters pixels of the guest-submitted content (or of the filtered guest-submitted content obtained at 240) that have similar colors. In some embodiments, the image processor 120 can separate the pixels into three different groups or clusters. However, it will be appreciated that the number of different groups or clusters can adjusted based on the requirements of the application and the number of colors desired for the color scheme. It will also be appreciated that increasing the number of groups or clusters can increase the processing time for grouping or clustering the pixels. In some embodiments, the image processor 120 can use a k-means clustering algorithm to group or cluster the pixels of the guest-submitted content based on color. In some embodiments, the image processor 120 can use the numerical value identified at 230 for each pixel to determine which pixels have similar colors. In particular, the k-means clustering can partition the clusters of pixels based on, for example, a closest mean value of the mathematical color model numerical value for each of the pixels. It will be appreciated that the threshold range used to determine whether pixels have similar colors can depend on the number groups or clusters being created. The greater number of groups or clusters, the smaller the threshold range to determine whether pixels have similar colors. The method 200 then proceeds to 260.

At 260, the image processor 120 identifies a representative color for each group or cluster of pixels to develop an aesthetically pleasing color scheme. In some embodiments the representative color can be identified within a mathematical color model and the image processor 120 can identify the representative color using one or more numerical values such as, for example, a decimal or hexadecimal value. In some embodiments, the representative color for each group or cluster can be identified, for example, by identifying the color of the first pixel stored in memory for the particular group or cluster. In these embodiments, it will be appreciated that the representative color identified is a random color and could be different each time the guest-submitted content is processed using the method 200. In some embodiments, the image processor 120 can calculate a mathematical average color of all of the colors in a particular group or cluster and select the calculated average color as the representative color for the particular group or cluster. In some embodiments, the image processor 120 can calculate a mathematical median color of all of the colors in a particular group or cluster and select the calculated median color as the representative color for the particular group or cluster. The representative color for each of the groups or clusters can together form a color scheme for the guest-submitted content. In some embodiments, the image processor 120 can store the developed color scheme for the guest-submitted content as one or more numerical values in the database 160. A color scheme can have as many different colors as clusters that were found in the processing of the image, or one color can be denoted from the clusters as the identified color scheme. For example, when the pixels are grouped into three clusters at 250, an array of the three numerical values based on the mathematical color model can be stored in the database 160. In another example, the image processor 120 can identify and store a single color from the three numerical values in the database 160 and remove the other two numerical values.

Figure 3:
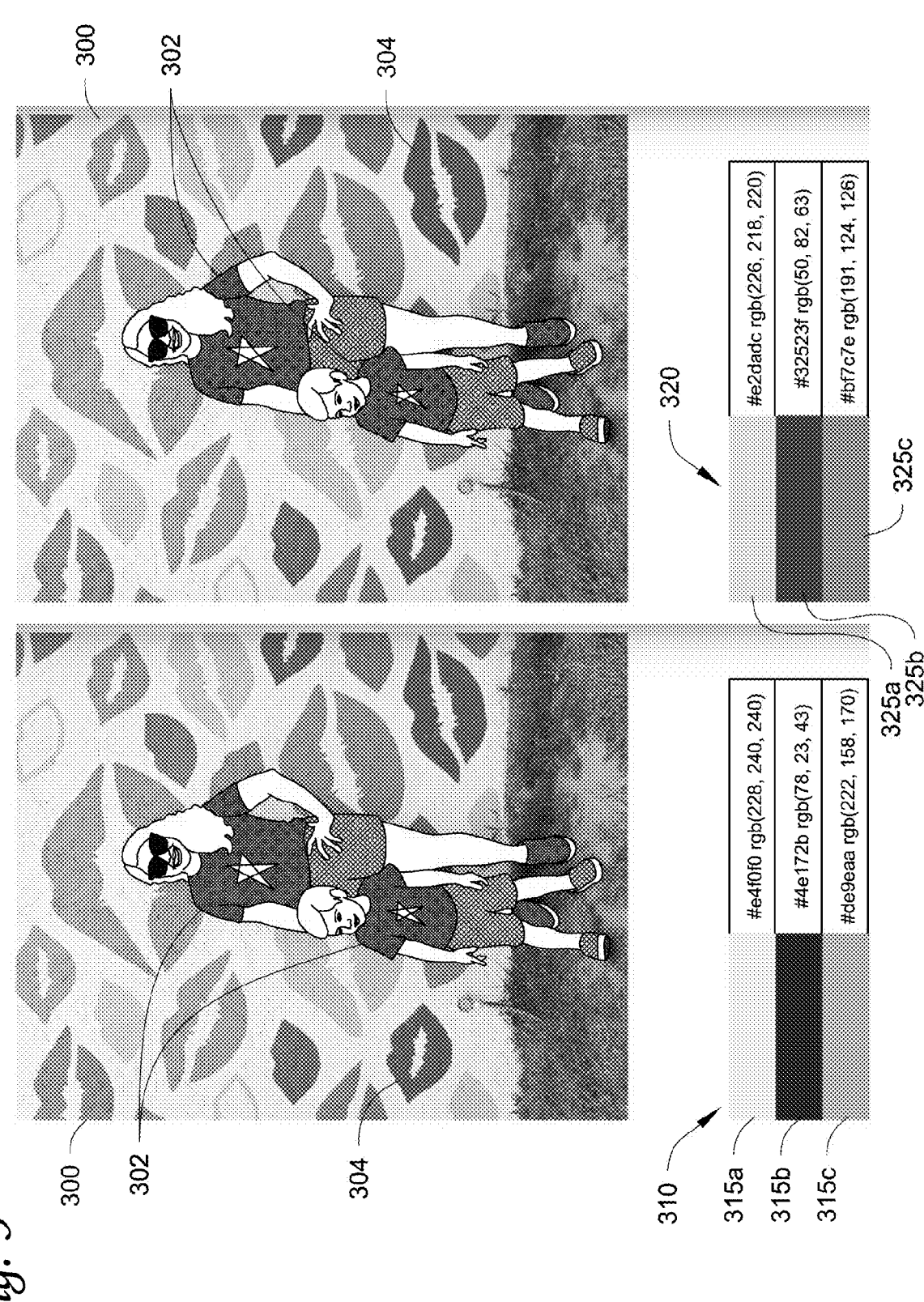
FIG. 3 illustrates a guest-submitted content with different color schemes, according to one embodiment.

FIG. 3 shows an example of a guest-submitted content 300 with two different color schemes 310, 320 developed using the method 200. Both of the color schemes 310, 320 are made up of three representative colors. The guest-submitted content 300 is a photograph that includes subjects 302 and a background 304. The first color scheme 310 includes representative colors 315a,b,c that were identified based on the first pixel stored in memory for each of the three groups or clusters. Representative color 315a has a hexadecimal color value (HEX color) #e4f0f0 and a red, blue, green (RGB) value (228, 240, 240). Representative color 315b has a HEX color #4e172b and a RGB value (78, 23, 43). Representative color 315c has a HEX color #de9eaa and a RGB value (222, 158, 170). The second color scheme 320 includes representative colors 325a,b,c that were each identified based on a mathematical average color of all the pixels stored in memory for the particular group or cluster. Representative color 325a has a HEX color #e2dadc and a RGB value (226, 218, 220). Representative color 325b has a HEX color #32523f and a RGB value (50, 82, 63). Representative color 325c has a HEX color #bf7c7e and a RGB value (191, 124, 126). Thus, it will be appreciated that way in which a representative color is selected for each group or cluster can impact the resulting representative colors identified at 260.

Figure 4A:
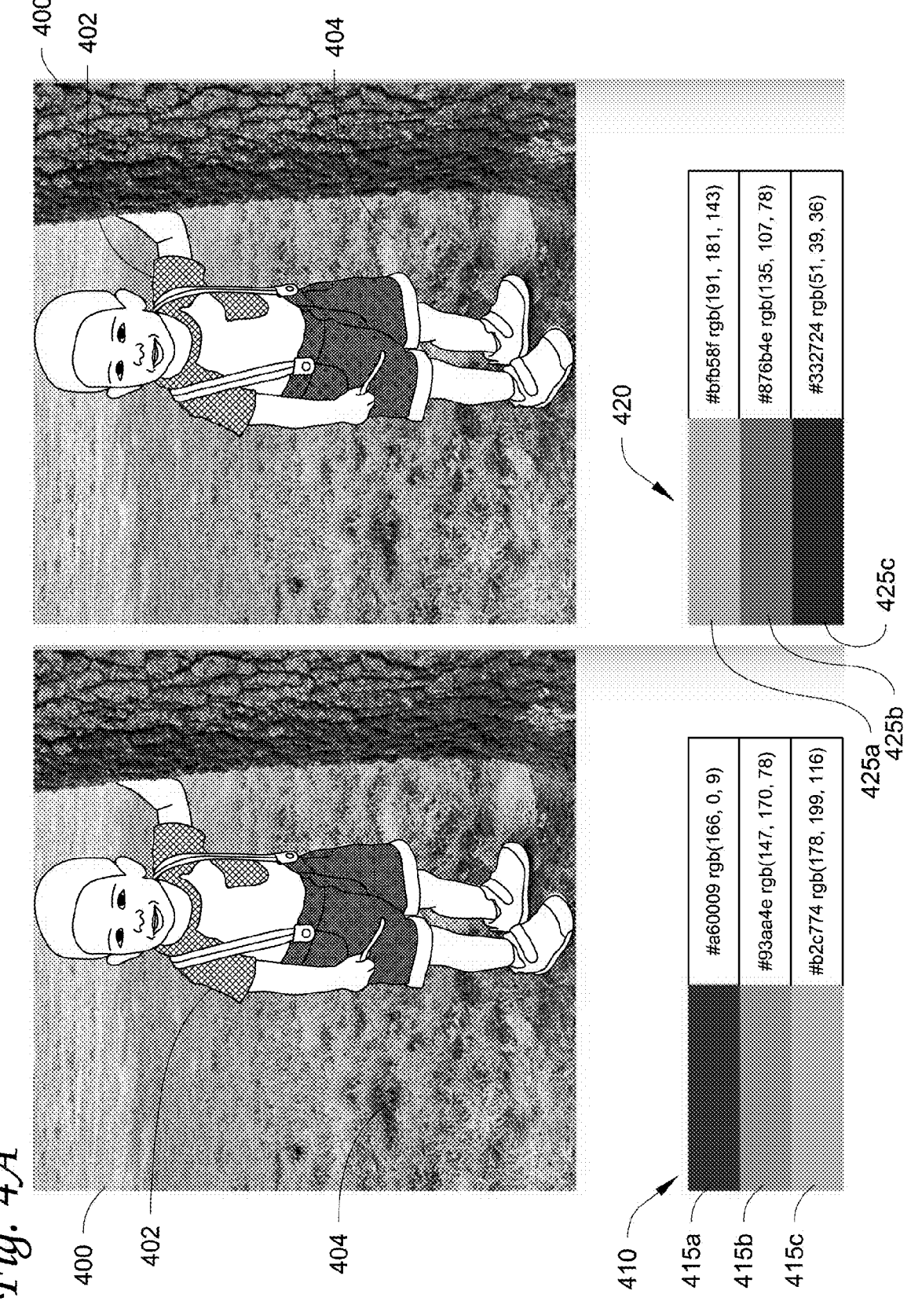
FIG. 4A illustrates a guest-submitted content with different color schemes, according to another embodiment.
Figure 4B:
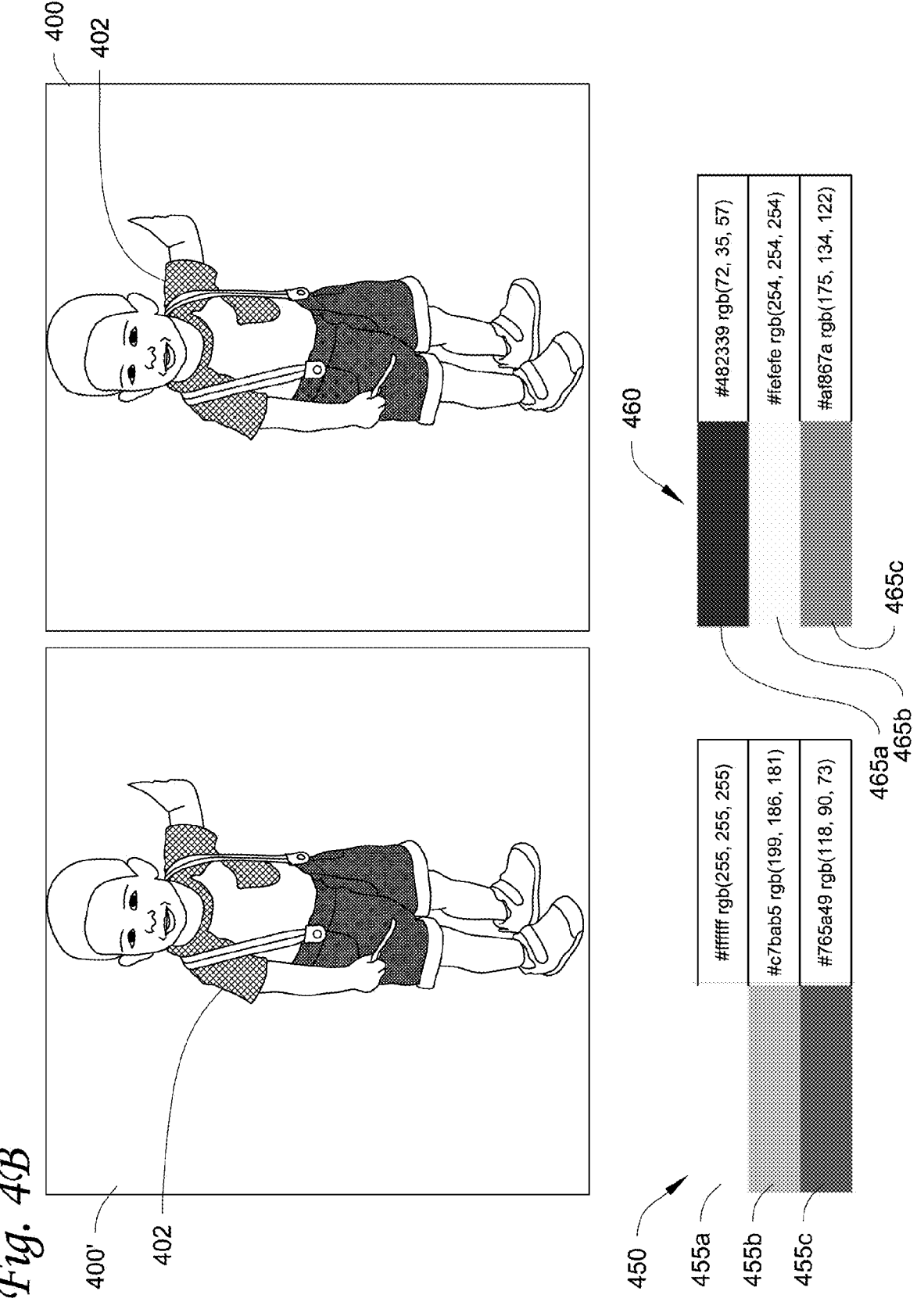
FIG. 4B illustrates a filtered version of the guest-submitted content provided in FIG. 4A with different color schemes, according to one embodiment.

FIG. 4A shows another example of a guest-submitted content 400 with two different color schemes 410, 420 developed using the method 200. Both of the color schemes 410, 420 are made up of three representative colors. The guest-submitted content 400 is a photograph that includes a subject 402 and a background 404. The first color scheme 410 includes representative colors 415a,b,c that were identified based on the first pixel stored in memory for each of the three groups or clusters. Representative color 415a has a HEX color #a60009 and a RGB value (166, 0, 9). Representative color 415b has a HEX color #93aa4e and a RGB value (147, 170, 78). Representative color 415c has a HEX color #b2c774 and a RGB value (178, 199, 116). The second color scheme 420 includes representative colors 425a,b,c that were each identified based on a mathematical average color of all the pixels stored in memory for the particular group or cluster. Representative color 425a has a HEX color #bfb58f and a RGB value (191, 181, 143). Representative color 425b has a HEX color #876b43 and a RGB value (135, 107, 78). Representative color 425c has a HEX color #332724 and a RGB value (51, 39, 36). In some embodiments, the color schemes 410, 420 developed using the method 200 may not provide FIG. 4B shows a filtered guest-submitted content 400' with two different color schemes 450, 460 developed using the method 200 including filtering out pixel(s) at 240. In particular, FIG. 4B shows an example of color schemes 450, 460 that can be developed using the method 200 when the image processor 120 identifies and filters out the guest-submitted content 400 of FIG. 4A to remove pixel(s) forming the background 404. The first color scheme 450 includes representative colors 455a,b,c that were identified based on the first pixel stored in memory for each of the three groups or clusters. Representative color 455a has a HEX color #ffffff and a RGB value (255, 255, 255). Representative color 455b has a HEX color #c7bab5 and a RGB value (199, 186, 181). Representative color 455c has a HEX color #765a49 and a RGB value (118, 90, 73). The second color scheme 460 includes representative colors 465a,b,c that were each identified based on a mathematical average color of all the pixels stored in memory for the particular group or cluster. Representative color 465a has a HEX color #482339 and a RGB value (72, 35, 57). Representative color 465b has a HEX color #af867a and a RGB value (175, 134, 122).

Returning to FIG. 2, in some embodiments, the image processor 120 can tag each of the representative colors for the developed color scheme with a particular color name and store the color names with the developed color scheme in the database 160. For example, each of a plurality of color names (e.g., blue, navy blue, electric-blue, red, deep-pink, fuchsia-pink, magenta, orange, yellow, canary, white, etc.) can be defined to have a particular numerical color range. For example, the color name "magenta" can be defined as any numerical values within the range of (255, 128, 255) (i.e., a light magenta) to (139, 0, 139) (i.e., a dark magenta), (including (255, 0, 255) (i.e., magenta)). The image processor 120 can determine whether the numerical color value of any of the identified representative colors falls within a numerical color range associated with a particular color name. Each of the representative colors that fall within a numerical color range for a particular name can be tagged with the associated color name when being stored in the database 160. The method 200 then proceeds to 270.

At 270, the GUI designer module 130 implements the color scheme developed at 260 into at least a portion of the retailer GUI 140. For example, in some embodiments, while the retailer GUI 140 is progressively loading a guest-submitted content for display at a particular location, the GUI designer module 130 can instruct the retailer GUI 140 to display one or more colors of the color scheme developed at 260 at the particular location as a background while the associated guest-submitted content is being progressively loaded. In some embodiments, the GUI designer module 130 can instruct the retailer GUI 140 to display only one of the representative colors (i.e., a solid color) of the color scheme developed at 260 while the associated guest-submitted content is being progressively loaded. In other embodiments, the GUI designer module 130 can instruct the retailer GUI 140 to display two or more of the representative colors of the color scheme developed at 260 at the location as a background while the associated guest-submitted content is being progressively loaded. In these embodiments, the two or more representative colors being displayed as a background can be shown as a gradient pattern of colors (e.g., a horizontal gradient pattern, a vertical gradient pattern, a diagonal gradient pattern, etc.).

Figure 5A:
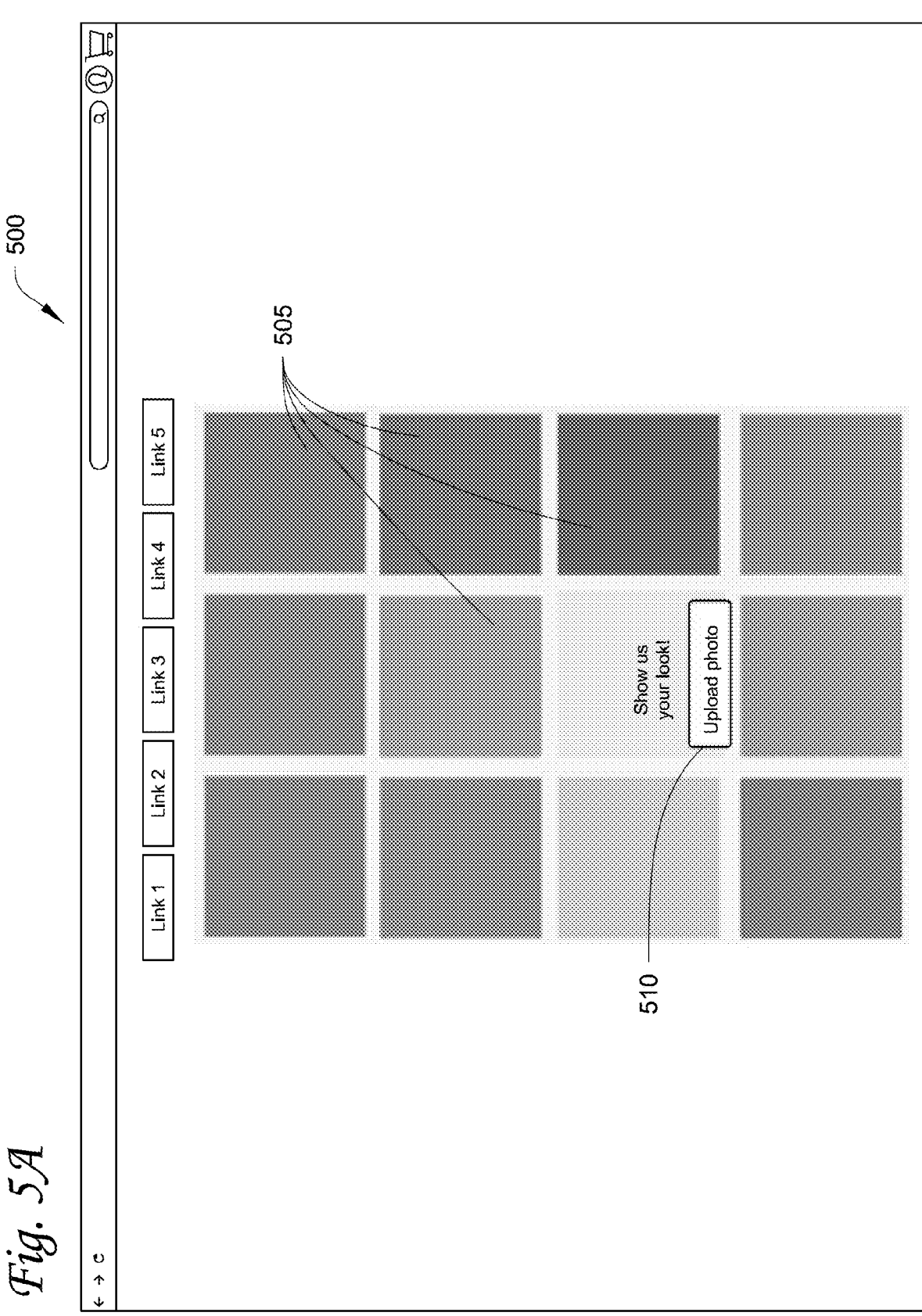
FIG. 5A illustrates a screenshot of a portion of a retailer GUI prior to guest-submitted content being loaded for display, according to one embodiment.
Figure 5B:
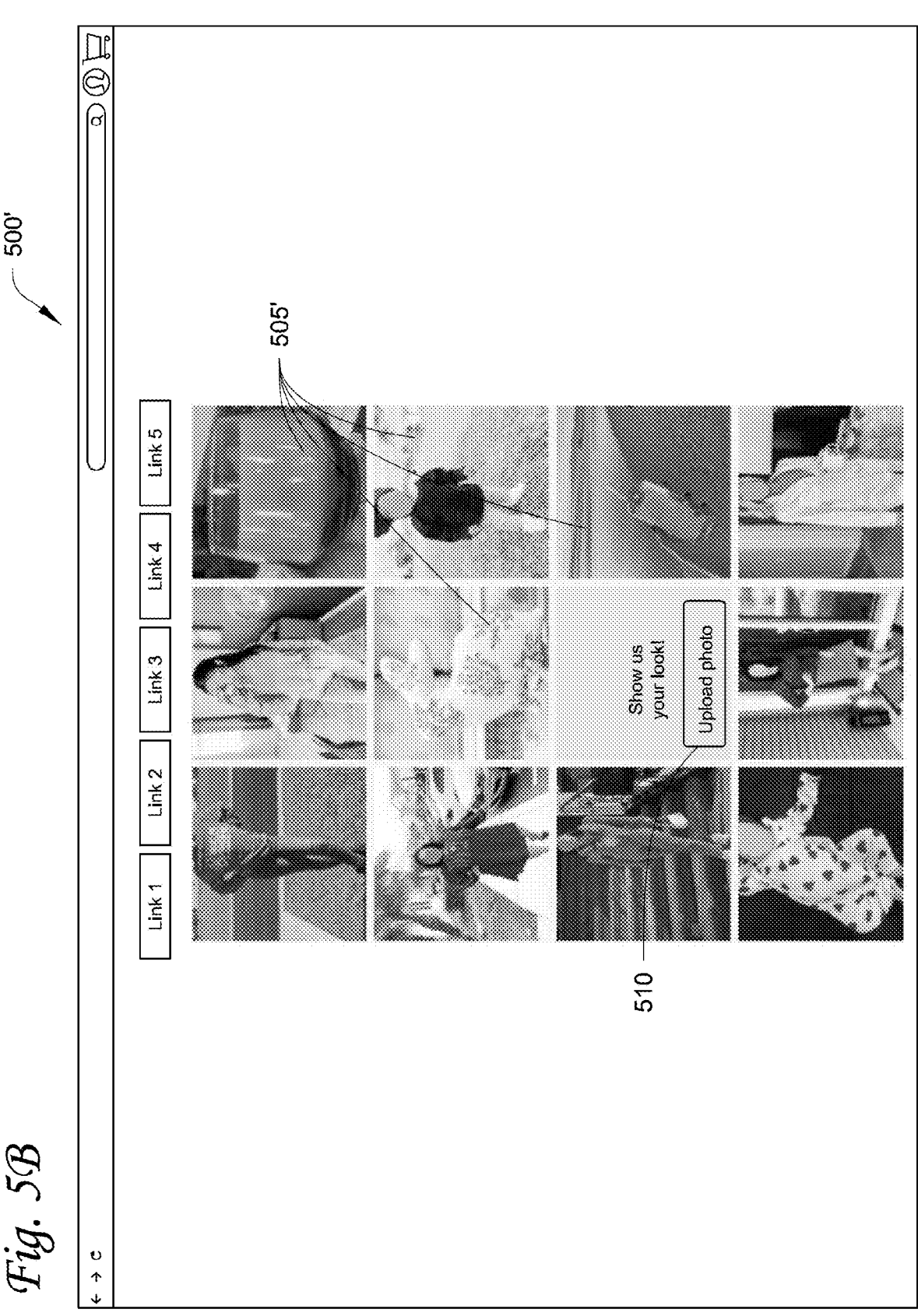
FIG. 5B illustrates a screenshot of the portion of the retailer GUI shown in FIG. 5A with progressively loaded guest-submitted content, according to one embodiment.

FIGS. 5A and 5B illustrate screenshots of a portion of a retailer GUI 500, 500'. The retailer GUI 500 shown in FIG. 5A includes a plurality of spaces 505 where guest-submitted content can be progressively loaded for display. Each of the spaces 505 is displayed with a background color. The background color can be a representative color of the particular guest-submitted content to be loaded in the respective space 505. FIG. 5B shows the retailer GUI 500' where each of the spaces 505 is replaced with guest-submitted content 505'. FIGS. 5A and 5B also include a link 510 that a guest can select to open, for example, an application programming interface (API) to allow the guest to submit their own guest-submitted content. In some embodiments, each of the user-generate content 505' can be embedded with a link that allows a guest to browse and shop for one or more products shown in the particular guest-submitted content 505'. It will be appreciated that the spaces 505 can improve the aesthetic appearance of the retailer GUI 500, 500' while guest-submitted content 505' is being progressively loaded for display.

Returning to 270, in another example, the GUI designer module 130 can dynamically select a color scheme for a portion of the retailer GUI 140 based on the color scheme developed at 260 for a specific piece of guest-submitted content that is to be displayed on the retailer GUI 140.

Accordingly, a website or app designer does not need to choose the colors for the portion of the retailer GUI 140 displaying a guest-submitted content and can simply use the color scheme developed at 260.

In yet another example, the GUI designer module 130 can instruct a film strip display spotlighting different pieces of guest-submitted content on a portion of the retailer GUI 140 to adjust a background color of the film strip based on the guest-submitted content being loaded onto the film strip display. For example, for a particular guest-submitted content being loaded onto the film strip, the GUI designer module 130 can instruct the retailer GUI 140 to use one of the representative colors forming the developed color scheme at 260 of the particular guest-submitted content as a background color of the film strip display.

Figures 6A, 6B:
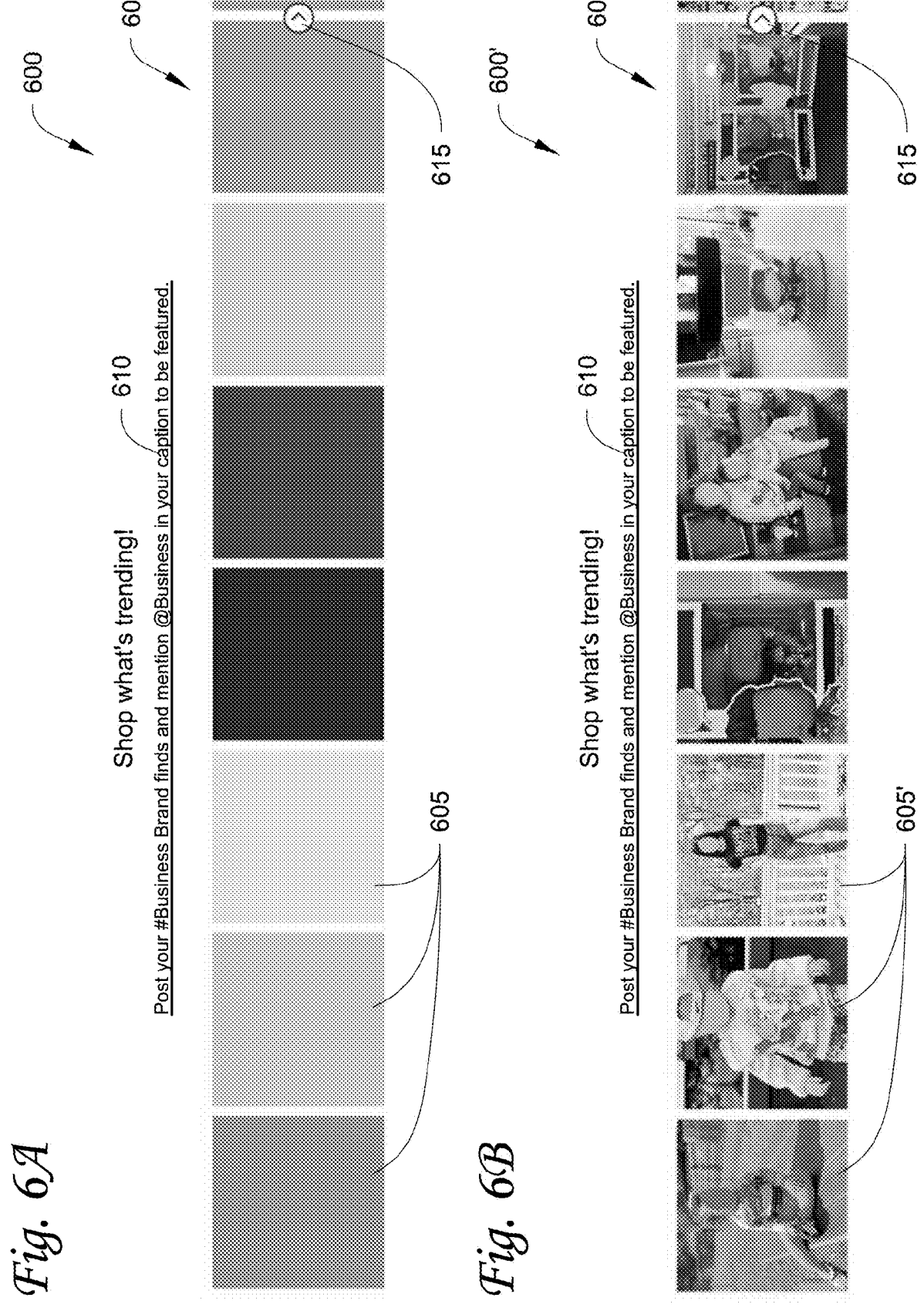
FIG. 6A illustrates a screenshot of a portion of a retailer GUI that includes a film strip display for showcasing guest-submitted content prior to the guest-submitted content being loaded, according to one embodiment.
FIG. 6B illustrates a screenshot of the portion of the retailer GUI shown in FIG. 6A with progressively loaded guest-submitted content, according to one embodiment.

FIGS. 6A and 6B illustrate screenshots of a portion of a retailer GUI 600, 600'. The retailer GUI 600 shown in FIG. 6A includes a film strip display 602 with a plurality of spaces 605 where guest-submitted content can be progressively loaded for display. Each of the spaces 605 is displayed with a background color. The background color can be a representative color of the particular guest-submitted content to be loaded in the respective space 605. FIG. 6B shows the retailer GUI 600' where each of the spaces 605 is replaced with guest-submitted content 605'. FIGS. 6A and 6B also include a link 610 that a guest can select to open, for example, an application programming interface (API) to allow the guest to submit their own guest-submitted content. In some embodiments, each of the user-generate content 605' can be embedded with a link that allows a guest to browse and shop for one or more products shown in the particular guest-submitted content 605'. Also, FIGS. 6A and 6B include a scroll bar button 615 that allows a user to view more content on the film strip display 602, 602'. It will be appreciated that the spaces 605 can improve the aesthetic appearance of the retailer GUI 600, 600' while guest-submitted content 605' is being progressively loaded for display on the film strip display 602'.

In yet another example, the color scheme developed at 260 can be used when adding and/or modifying guest-submitted content to a portion of the retailer GUI 140. In particular, when a website or app designer is adding a caption or username handle to the guest-submitted content, the color of the caption or username handle can be automatically selected by the GUI designer module 130 based on the color scheme developed at 260. In some embodiments, the GUI designer module 130 can select a color of the caption or username handle that is a complementary color of one of the representative colors of the color scheme developed at 260. In some embodiments, the GUI designer module 130 can select a color of the caption or username handle that is a triadic color of one of the representative colors of the color scheme developed at 260. For example, the GUI designer module 130 can select a triadic color for the caption or username handle when, for example, one or more of the representative colors of the color scheme developed at 260 is a light color, or the value of the color is closer to white (i.e., (255, 255, 255)) than to black (i.e., (0, 0, 0)).

Figure 7:
FIG. 7 illustrates a screenshot of a portion of a retailer GUI that includes guest-submitted content with caption boxes, according to one embodiment.

FIG. 7 illustrates a screenshot of a portion of a retailer GUI 700 that includes guest-submitted content 705, 710. Each of the guest-submitted content 705, 710 includes a caption box 707, 712 with text provided therein that can include, for example, a social media handle for the guest who uploaded the guest-submitted content 705, 710. In some embodiments, the color scheme developed for the guest-submitted content 705 can include a representative color that is green and has a HEX color #999c59 and a RGB value (153, 156, 89). When a website or app designer is adding the caption box 707 to the guest-submitted content 705, the designer can use a GUI designer module (e.g. the GUI designer module 130 in FIG. 1) to automatically select a complementary color to the representative color for the caption box 707. In FIG. 7, the GUI designer module automatically selects a complementary color having a HEX color #6663a6 and a RGB value (153, 156, 89).

Also, in some embodiments, the color scheme developed for the guest-submitted content 710 can include a representative color that is tan and has a HEX color #f6eddc and a RGB value (246, 237, 220). When a website or app designer is adding the caption box 712 to the guest-submitted content 710, the designer can use the GUI designer module to automatically select a triadic color to the representative color for the caption box 712. In FIG. 7, the GUI designer module automatically selects a triadic color having a HEX color #dcf6ef and a RGB value (220, 246, 239). However, the GUI designer module could also automatically select another triadic color having a HEX color #ecddf7 and a RGB value (236, 221, 247).

Figure 8A:
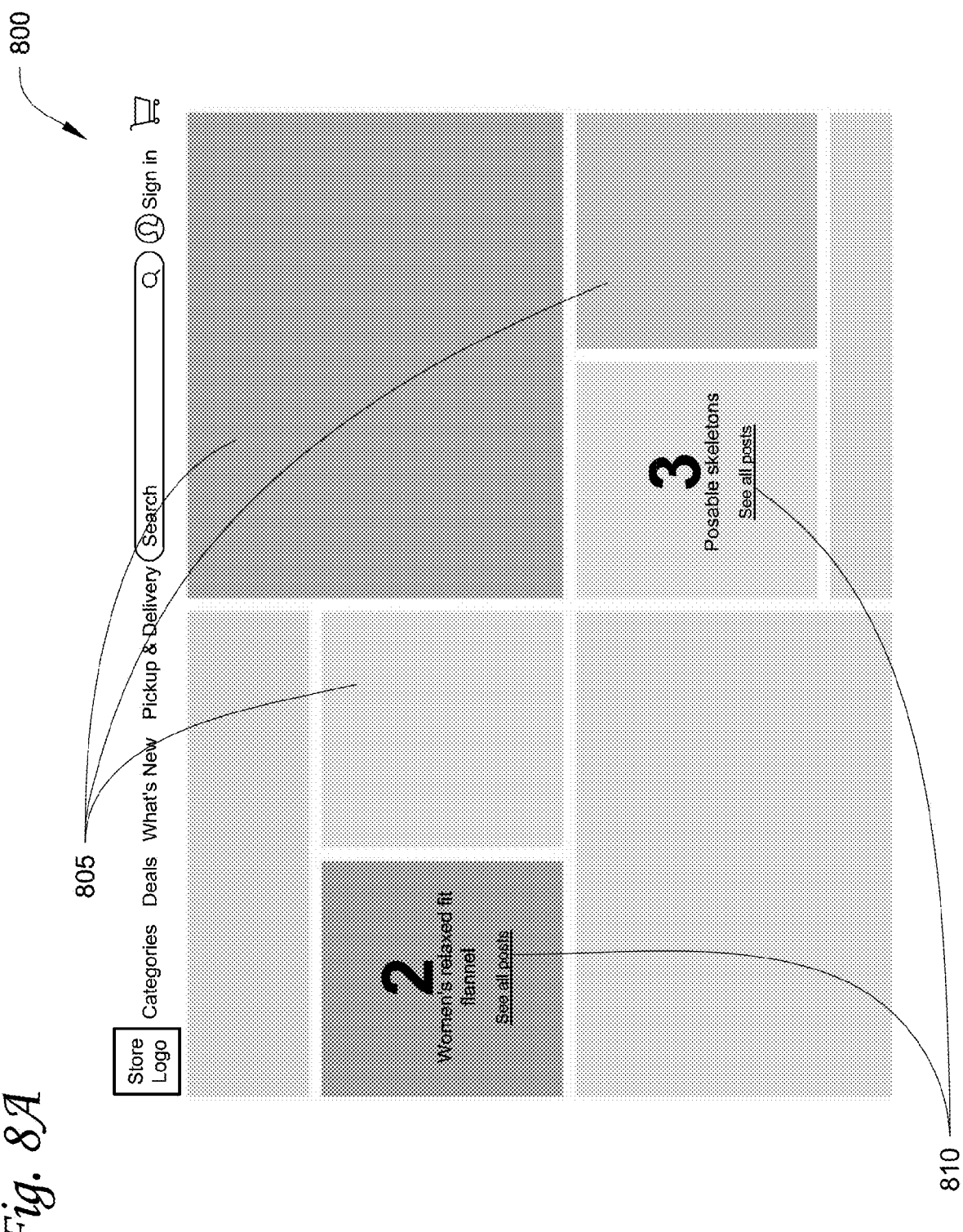
FIG. 8A illustrates a screenshot of a portion of a retailer GUI prior to guest-submitted content being loaded being loaded for display, according to one embodiment.
Figure 8B:
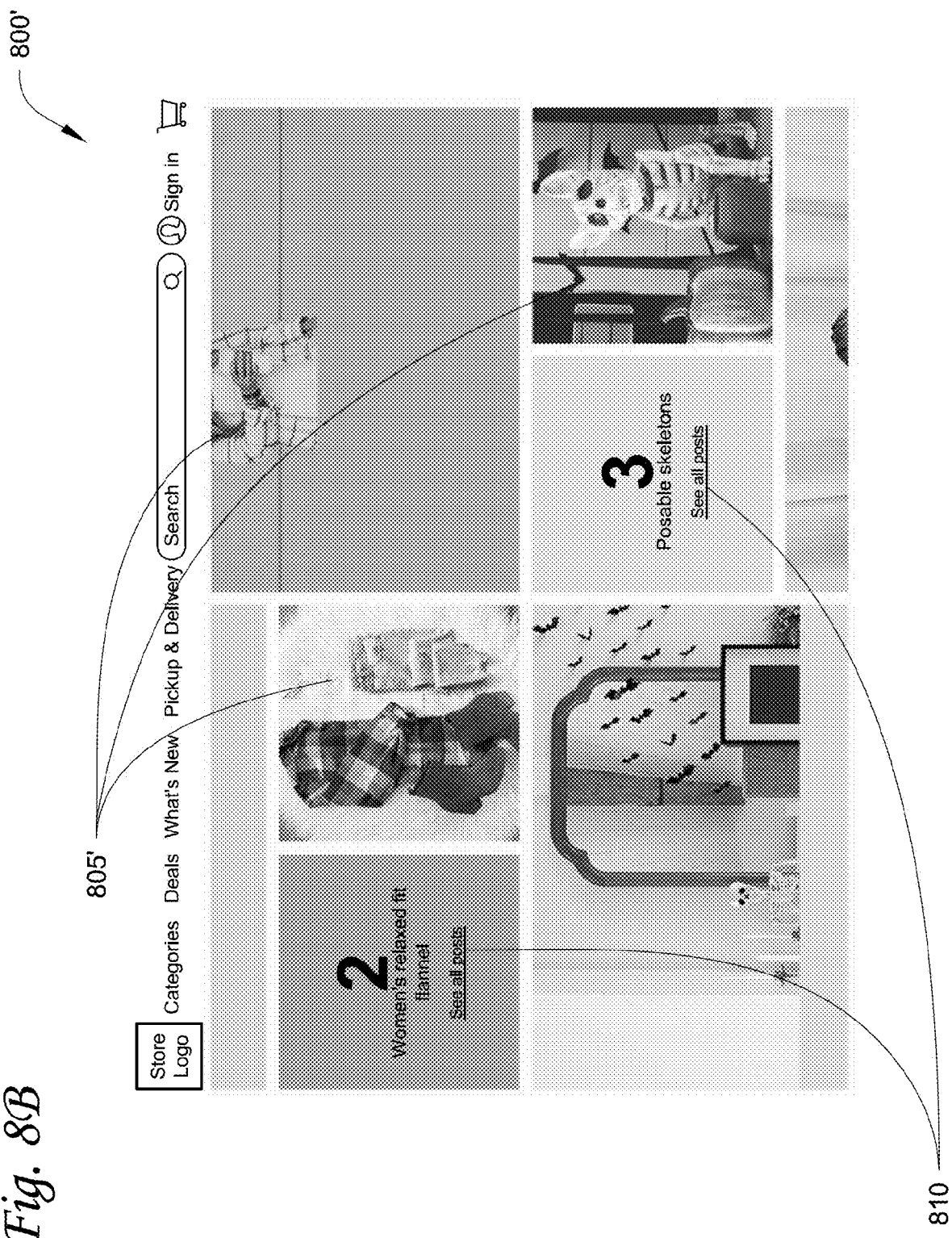
FIG. 8B illustrates a screenshot of the portion of the retailer GUI shown in FIG. 6A while progressively loaded guest-submitted content is being loaded on the display, according to one embodiment.
Figure 8C:
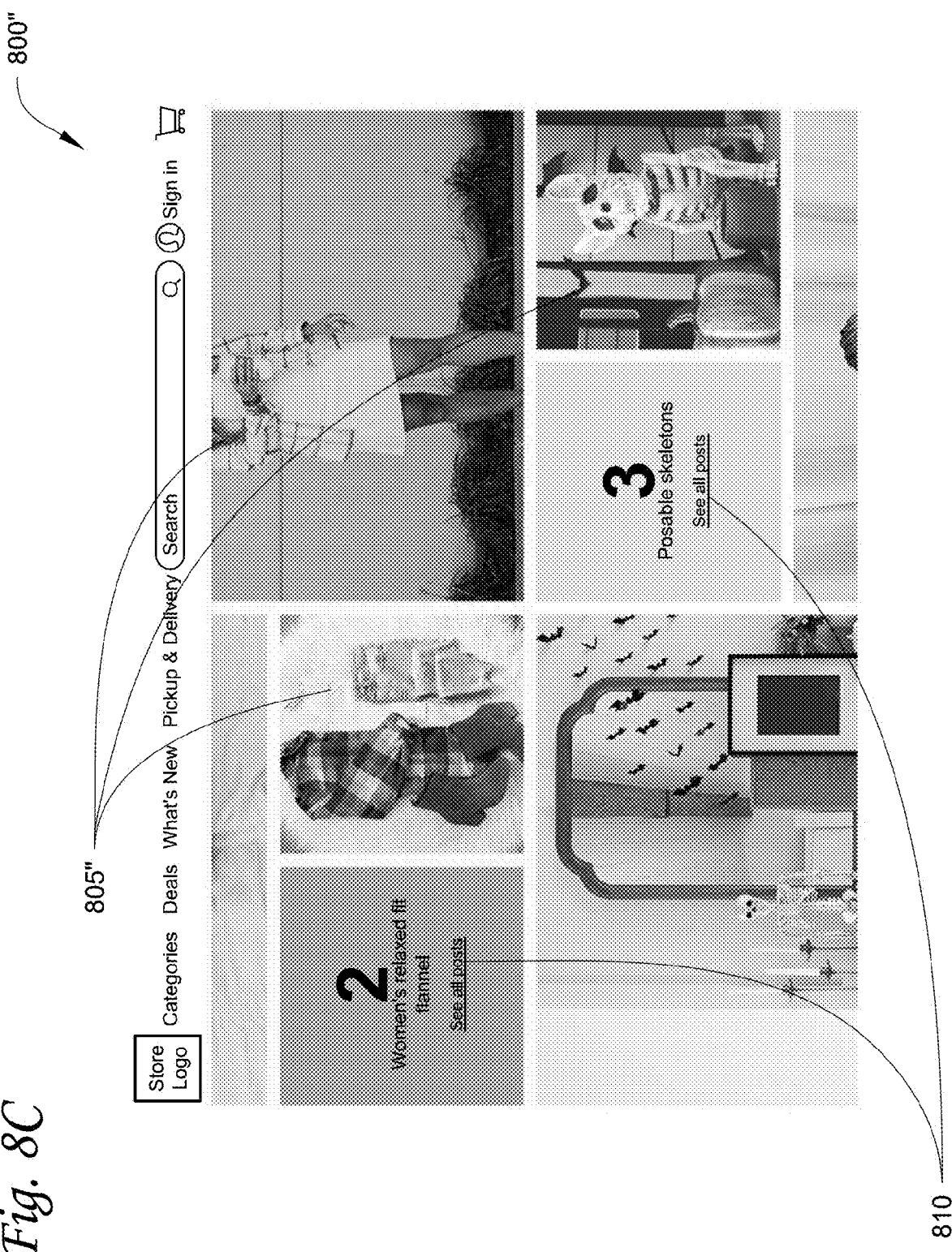
FIG. 8C illustrates a screenshot of the portion of the retailer GUI shown in FIGS. 8A and 8B with progressively loaded guest-submitted content loaded on the display, according to one embodiment.

FIGS. 8A-8C illustrate screenshots of a portion of a retailer GUI 800, 800', 800" The retailer GUI 800 shown in FIG. 8A includes a plurality of spaces 805 where guest-submitted content can be progressively loaded for display. Each of the spaces 805 is displayed with a background color. The background color can be a representative color of the particular guest-submitted content to be loaded in the respective space 805. FIG. 8B shows the retailer GUI 800' while each of the spaces 805 is being progressively loaded with guest-submitted content 805'. As shown in FIG. 8B, the guest-submitted content 805' has not yet been completely loaded for display. FIG. 8C shows the retailer GUI 800" after each of the spaces 805 is loaded with guest-submitted content 805". FIGS. 8A-8C also include links 810 that a guest can select to view related guest-submitted content. In some embodiments, each of the user-generate content 805" can be embedded with a link that allows a guest to browse and shop for one or more products shown in the particular guest-submitted content 805". It will be appreciated that the spaces 805 can improve the aesthetic appearance of the retailer GUI 800, 800', 800" while guest-submitted content 805', 805" is being progressively loaded for display.

Returning to 270, in yet another example, a website or app designer for the retailer GUI 140 can use the GUI designer module 130 to identify guest-submitted content tagged with one or more colors names associated the color schemes developed at 260. In some embodiments, the GUI designer module 130 can search the database 160 for any guest-submitted content tagged with a particular color name (e.g., blue, navy blue, electric-blue, red, deep-pink, fuchsia-pink, magenta, orange, yellow, canary, white, etc.). Accordingly, the website or app designer can use the GUI designer module 130 to design at least a portion of the retailer GUI 140 with one or more particular colors and can find guest-submitted content stored in the database 160 whose color scheme developed at 260 is tagged with the one or more particular colors names being used by the designer. In some embodiments, the website or app designer can search the database 160 for recently received guest-submitted content (e.g., within the past day, week, month, etc.) to determine trending colors names that are being tagged with the guest-submitted content. Accordingly, the website or app designer can create a portion of the retailer GUI 140 using colors associated with the trending color names.

Figure 9:
FIG. 9 illustrates a portion of a GUI for accessing a GUI designer module of a retailer online service, according to one embodiment.
Figure 9:
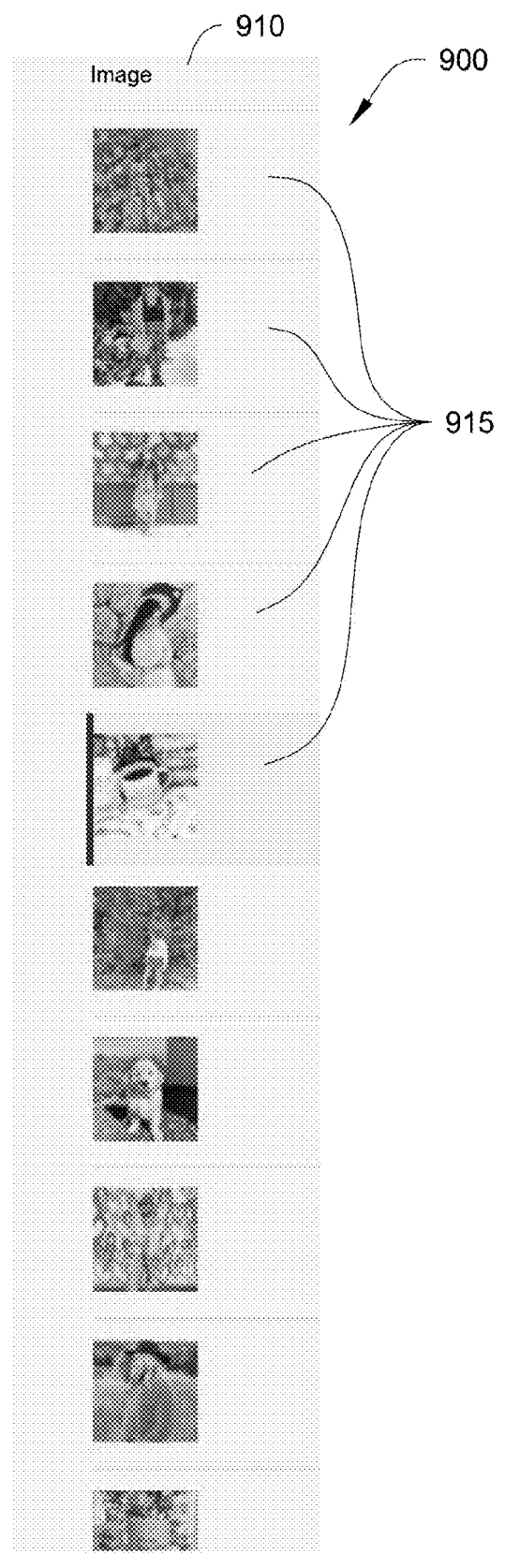

FIG. 9 illustrates a portion of a GUI 900 for accessing the GUI designer module 130 that allows a website or app designer to search for guest-submitted content tagged with a particular color name associated with the color scheme for the particular guest-submitted content. The GUI 900 includes a color search bar 905 that lists a plurality of color names and allows the designer to select particular color names for searching. Upon selection of color names from the color search bar 905, an image bar 910 displays guest-submitted content 915 that are tagged with the particular color names selected. For example, as shown in FIG. 9, the color names deep-pink, magenta, mona-9 displays each of the guest-submitted content 915 that is tagged with at least one of these colors. That is, each of the guest-submitted content 915 has a color scheme with a representative color associated with the colors selected by the color search bar 905.

Figure 10:
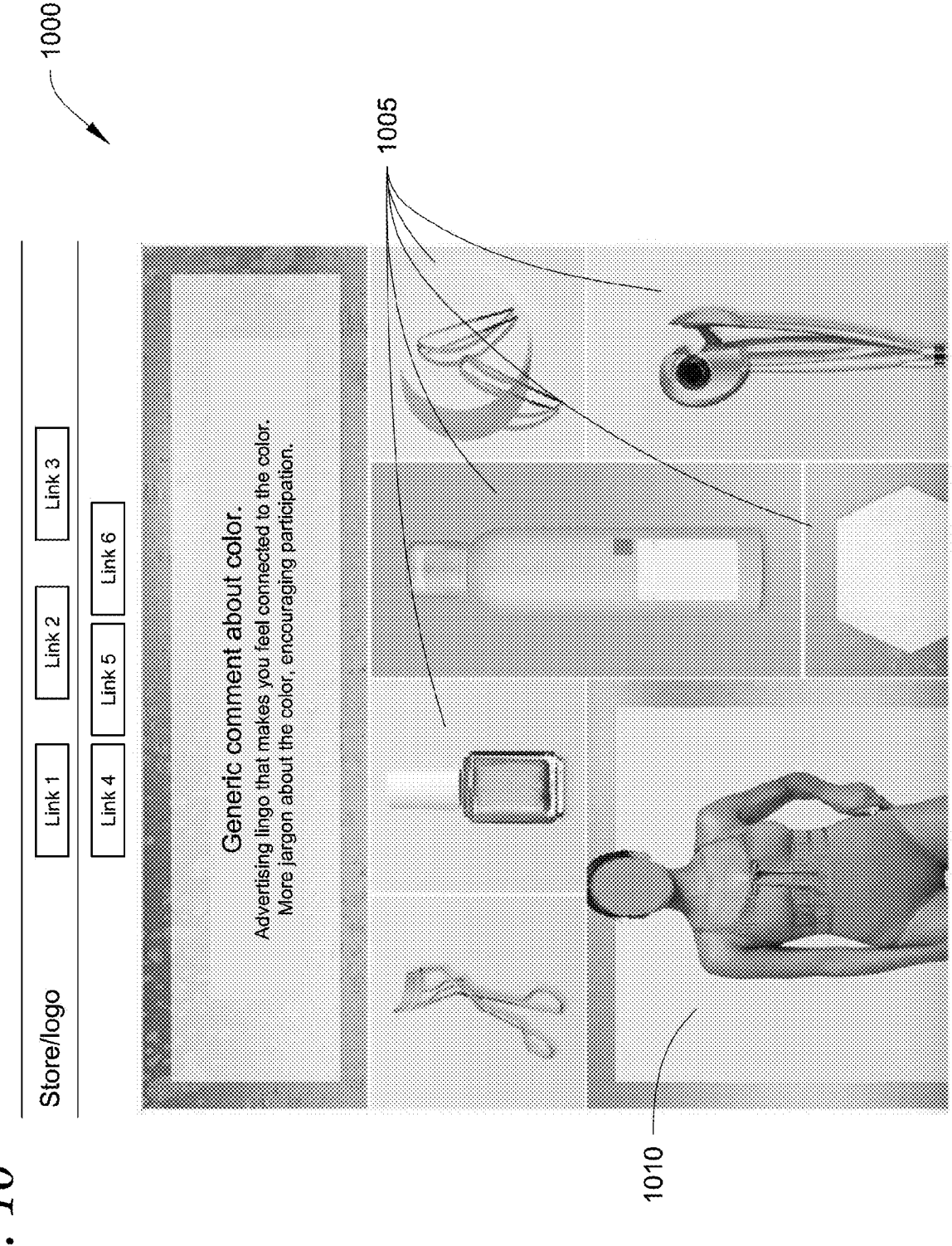
FIG. 10 illustrates a screenshot of a retailer GUI that incorporates a specific color scheme, according to one embodiment.

As shown in FIG. 10, this can allow a designer to create/update a portion of the retailer GUI 140 with a particular color scheme and find aesthetically pleasing guest-submitted content to display in this portion of the retailer GUI 140. That is, FIG. 10 shows a screenshot of a retailer GUI 1000 that incorporates a specific color scheme. The retailer GUI 1000 includes a plurality of product images 1005 and a guest-submitted content 1010. The guest-submitted content 1010 has an associated color scheme with at least one representative color that matches one of the colors in the specific color scheme of the retailer GUI 1000.

Figure 11:
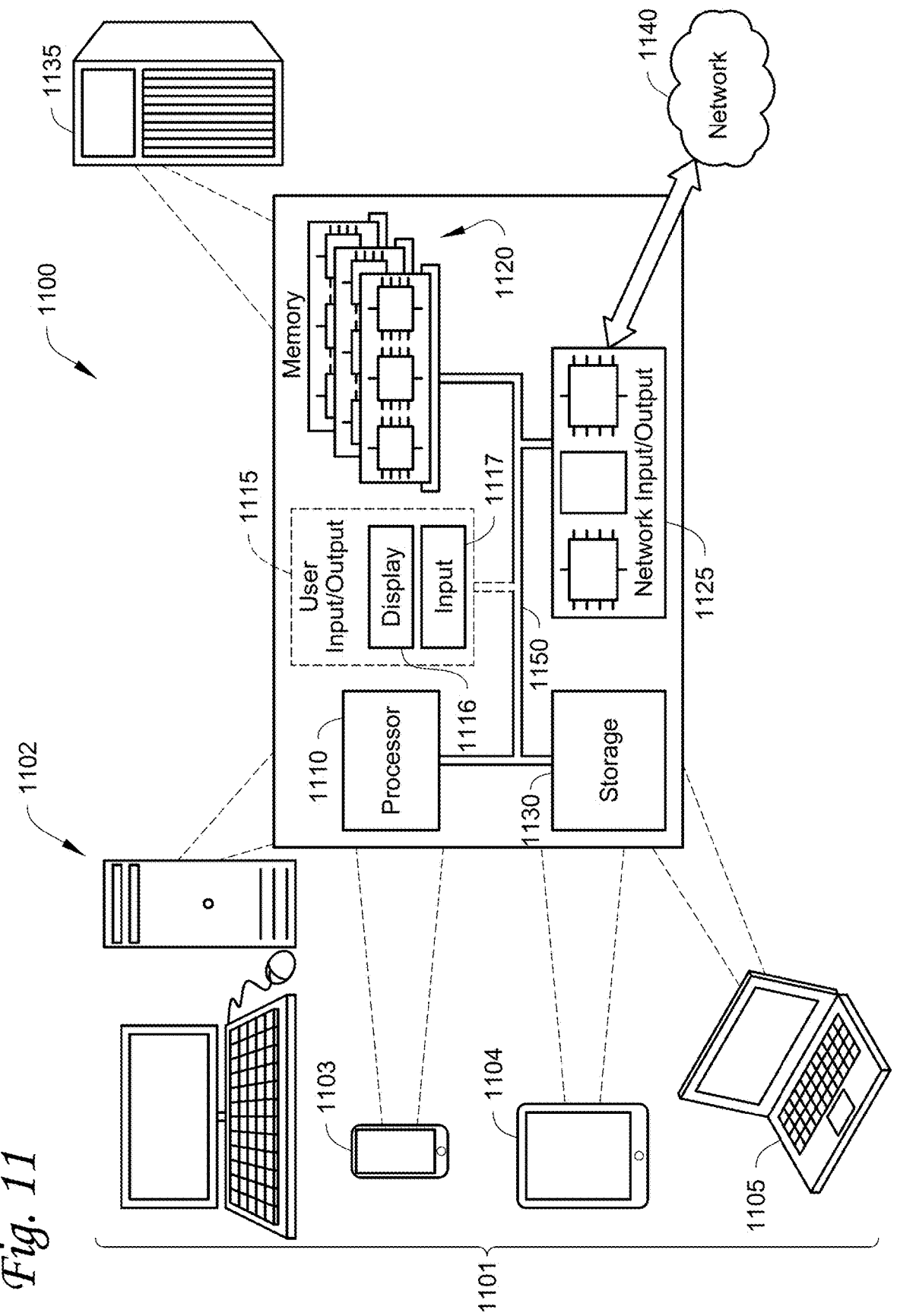
FIG. 11 illustrates a schematic diagram of architecture for a computer device, according to one embodiment.

FIG. 11 is a schematic diagram of architecture for a computer device 1100, according to an embodiment. The computer device 1100 and any of the individual components thereof can be used for any of the operations described in accordance with any of the computer-implemented methods described herein.

The computer device 1100 generally includes a processor 1110, memory 1120, a network input/output (I/O) 1125, storage 1130, and an interconnect 1150. The computer device 1100 can optionally include a user I/O 1115, according to some embodiments. The computer device 1100 can be in communication with one or more additional computer devices 1100 through a network 1140.

The computer device 1100 is generally representative of hardware aspects of a variety of user devices 1101 and a server device 1135. The illustrated user devices 1101 are examples and are not intended to be limiting. Examples of the user devices 1101 include, but are not limited to, a desktop computer 1102, a cellular/mobile phone 1103, a tablet device 1104, and a laptop computer 1105. It is to be appreciated that the user devices 1101 can include other devices such as, but not limited to, a wearable device, a personal digital assistant (PDA), a video game console, a television, or the like. In an embodiment, the user devices 1101 can alternatively be referred to as client devices 1101. In such an embodiment, the client devices 1101 can be in communication with the server device 1135 through the network 1140. One or more of the client devices 1101 can be in communication with another of the client devices 1101 through the network 1140 in an embodiment.

The processor 1110 can retrieve and execute programming instructions stored in the memory 1120 and/or the storage 1130. The processor 1110 can also store and retrieve application data residing in the memory 1120. The interconnect 1150 is used to transmit programming instructions and/or application data between the processor 910, the user I/O 1115, the memory 1120, the storage 1130, and the network I/O 1140. The interconnect 1150 can be, for example, one or more busses or the like. The processor 1110 can be a single processor, multiple processors, or a single processor having multiple processing cores. In some embodiments, the processor 1110 can be a single-threaded processor. In an embodiment, the processor 1110 can be a multi-threaded processor.

The user I/O 1115 can include a display 1116 and/or an input 1117, according to an embodiment. It is to be appreciated that the user I/O 1115 can be one or more devices connected in communication with the computer device 1100 that are physically separate from the computer device 1100. For example, the display 1116 and input 1117 for the desktop computer 1102 can be connected in communication but be physically separate from the computer device 1100. In some embodiments, the display 1116 and input 1117 can be physically included with the computer device 1100 for the desktop computer 1102. In an embodiment, the user I/O 1115 can physically be part of the user device 1101. For example, the cellular/mobile phone 1103, the tablet device 1104, and the laptop 1105 include the display 1116 and input 1117 that are part of the computer device 1100. The server device 1135 generally may not include the user I/O 1115. In an embodiment, the server device 1135 can be connected to the display 1116 and input 1117.

The display 1116 can include any of a variety of display devices suitable for displaying information to the user. Examples of devices suitable for the display 1116 include, but are not limited to, a cathode ray tube (CRT) monitor, a liquid crystal display (LCD) monitor, a light emitting diode (LED) monitor, or the like.

The input 1117 can include any of a variety of input devices or input means suitable for receiving an input from the user. Examples of devices suitable for the input 1117 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 1117 can be included for the user devices 1101. In some embodiments the input 1117 can be integrated with the display 1116 such that both input and output are performed by the display 1116.

The memory 1120 is generally included to be representative of a random access memory such as, but not limited to, Static Random Access Memory (SRAM), Dynamic Random Access Memory (DRAM), or Flash. In some embodiments, the memory 1120 can be a volatile memory. In some embodiments, the memory 1120 can be a non-volatile memory. In some embodiments, at least a portion of the memory can be virtual memory.

The storage 1130 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 1130 is a computer readable medium. In some embodiments, the storage 1130 can include storage that is external to the computer device 1100, such as in a cloud.

The network I/O 1125 is configured to transmit data via a network 1140. The network 1140 may alternatively be referred to as the communications network 1140. Examples of the network 1140 include, but are not limited to, a local area network (LAN), a wide area network (WAN), the Internet, or the like. In some embodiments, the network I/O 1125 can transmit data via the network 1140 through a wireless connection using Wi-Fi, Bluetooth, or other similar wireless communication protocols. In some embodiments, the computer device 1100 can transmit data via the network 1140 through a cellular, 3G, 4G, or other wireless protocol. In some embodiments, the network I/O 1125 can transmit data via a wire line, an optical fiber cable, or the like. It is to be appreciated that the network I/O 1125 can communicate through the network 1140 through suitable combinations of the preceding wired and wireless communication methods.

The server device 1135 is generally representative of a computer device 1100 that can, for example, respond to requests received via the network 1140 to provide, for example, data for rendering an online service (e.g., a website, an app, etc.) on the user devices 1101. The server 1135 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

An embodiment can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for altering the aesthetic appearance of a retailer graphical user interface, the method comprising:
   a retailer online service receiving a guest-submitted content;
   an image processor of the retailer online service performing image processing of the guest-submitted content to generate a plurality of pixels,
   the image processor identifying a color of each pixel of the plurality of pixels;
   the image processor grouping each of the plurality of pixels into a plurality of clusters based on the color of each pixel of the plurality of pixels;
   the image processor identifying a representative color for each of the plurality of clusters to develop a color scheme for the guest-submitted content; and
   implementing the color scheme when displaying the guest-submitted content onto the retailer graphical user interface,
   wherein implementing the color scheme includes the retailer graphical user interface displaying one or more of the representative colors of the color scheme as a background at a location where the guest-submitted content is to be displayed, wherein the one or more representative colors of the color scheme are displayed while the guest-submitted content is being progressively loaded at the location.

2. The method of claim 1, further comprising the image processor filtering out a portion of the plurality of pixels prior to the image processor grouping each of the plurality of pixels into the plurality of clusters.

3. The method of claim 2, wherein filtering out the portion of the plurality of pixels includes filtering out the portion of the plurality of pixels that form a background of the guest-submitted content.

4. The method of claim 2, wherein filtering out the portion of the plurality of pixels includes filtering out the portion of the plurality of pixels that are a first color.

5. The method of claim 1, wherein the image processor identifies the color of each pixel of the plurality of pixels using a mathematical color model and assigns the color of each pixel of the plurality of pixels with a numerical value based on the mathematical color model.

6. The method of claim 1, wherein the image processor grouping each of the plurality of pixels into the plurality of clusters includes applying a k-means clustering algorithm to each pixel of the plurality of pixels.

7. The method of claim 1, wherein the image processor identifying the representative color for each of the plurality of clusters to develop the color scheme includes identifying and assigning a color of a first pixel stored in memory for each of the plurality of clusters as the representative color.

8. The method of claim 1, wherein the image processor identifying the representative color for each of the plurality of clusters to develop the color scheme includes calculating an average color for all pixels of the plurality of pixels grouped within a particular cluster of the plurality of clusters.

9. The method of claim 1, further comprising the image processor tagging the representative color of one of the plurality of clusters with a color name.

10. The method of claim 9, wherein tagging the representative color of one of the plurality of clusters with the color name includes the image processor determining that a numerical value of the representative color is within a threshold range of the color name.

11. The method of claim 1, further comprising the retailer graphical user interface displaying two or more of the representative colors of the color scheme as the background in a gradient pattern.

12. The method of claim 1, wherein the image processor grouping each of the plurality of pixels into three clusters such that the color scheme includes three representative colors.

13. The method of claim 1, wherein the image processor performing image processing of the guest-submitted content to generate the plurality of pixels includes the image processor scanning the guest-submitted content to generate a two-dimensional array of the plurality of pixels.

14. The method of claim 1, wherein the guest-submitted content is a photograph or image uploaded by a guest of the retailer online service.

15. The method of claim 1, further comprising the retailer graphical user interface displaying an additional guest-submitted content that includes at least one representative color of the color scheme.

16. The method of claim 1, further comprising the retailer graphical user interface displaying one or more product images that includes at least one representative color of the color scheme.

17. The method of claim 1, further comprising the graphical user interface displaying a caption box that is automatically selected to have a complimentary color that is complementary to at least representative color of the color scheme.

18. A system for displaying a retailer graphical user interface, the system comprising:
   a retailer online service configured to receive a guest-submitted content, the retailer online service including an image processor;
   wherein the image processor is configured to:
      perform image processing of the guest-submitted content to generate a plurality of pixels,
      identify a color of each pixel of the plurality of pixels,
      group each of the plurality of pixels into a plurality of clusters based on the color of each pixel of the plurality of pixels,
      identify a representative color for each of the plurality of clusters to develop a color scheme for the guest-submitted content, and
      implement the color scheme when displaying the guest-submitted content onto the retailer graphical user interface,
   wherein the image processor being configured to implement the color scheme includes the retailer graphical user interface being configured to display one or more of the representative colors of the color scheme as a background at a location where the guest-submitted content is to be displayed, and
   wherein the one or more representative colors of the color scheme are configured to be displayed while the guest-submitted content is being progressively loaded at the location.

19. The system of claim 18, wherein the image processor is further configured to identify the color of each pixel of the plurality of pixels using a mathematical color model and assign the color of each pixel of the plurality of pixels with a numerical value based on the mathematical color model.

20. The system of claim 18, wherein the image processor is configured to group each of the plurality of pixels into the plurality of clusters includes being configured to apply a k-means clustering algorithm to each pixel of the plurality of pixels.

\* \* \* \* \*